United States Patent
Choi et al.

(10) Patent No.: US 8,681,302 B2
(45) Date of Patent: Mar. 25, 2014

(54) IN-PLANE SWITCHING MODE LIQUID CRYSTAL DISPLAY DEVICE, ARRAY SUBSTRATE FOR IN-PLANE SWITCHING MODE LIQUID CRYSTAL DISPLAY DEVICE AND METHOD OF DRIVING THE SAME

(75) Inventors: Sang-Ho Choi, Gunpo-Si (KR); Jong-Jin Park, Annyang-Si (KR)

(73) Assignee: LG Display Co., Ltd., Seoul (KR)

( * ) Notice: Subject to any disclaimer, the term of this patent is extended or adjusted under 35 U.S.C. 154(b) by 985 days.

(21) Appl. No.: 11/790,618

(22) Filed: Apr. 26, 2007

(65) Prior Publication Data

US 2007/0252938 A1 Nov. 1, 2007

(30) Foreign Application Priority Data

Apr. 27, 2006 (KR) .......................... 10-2006-0038297

(51) Int. Cl.
*G02F 1/1343* (2006.01)
(52) U.S. Cl.
USPC .......................................... 349/141; 349/139
(58) Field of Classification Search
USPC ................................................. 349/139–152
See application file for complete search history.

(56) References Cited

U.S. PATENT DOCUMENTS

| 6,292,245 | B1 | 9/2001 | Lee et al. |
| 6,452,657 | B1 | 9/2002 | Suzuki et al. |
| 6,549,258 | B1 | 4/2003 | Shin et al. |
| 2005/0140899 | A1* | 6/2005 | Ko .............................. 349/141 |

FOREIGN PATENT DOCUMENTS

| JP | 11-149084 A | 6/1999 |
| JP | 11-237648 A | 8/1999 |
| JP | 2000-98405 A | 4/2000 |
| JP | 2000-214465 | 8/2000 |
| JP | 2002-122876 A | 4/2002 |
| KR | 1020050066979 A | 6/2005 |

OTHER PUBLICATIONS

English language translation of portions of JP2000-214465 (7 pages).

* cited by examiner

*Primary Examiner* — Kevin S Wood
(74) *Attorney, Agent, or Firm* — Birch, Stewart, Kolasch & Birch, LLP (57) ABSTRACT

An array substrate and method for an in-plane switching mode liquid crystal display device are provided. The array substrate according to an embodiment includes a pixel electrode in a pixel region; a common electrode in the pixel region, the common electrode being parallel to the pixel electrode; a first electrode in the pixel region and crossing the pixel and common electrodes; and a second electrode in the pixel region, the second electrode being parallel to the first electrode.

27 Claims, 8 Drawing Sheets

FIG. 5B
rubbing direction

FIG. 5C
rubbing direction

IN-PLANE SWITCHING MODE LIQUID CRYSTAL DISPLAY DEVICE, ARRAY SUBSTRATE FOR IN-PLANE SWITCHING MODE LIQUID CRYSTAL DISPLAY DEVICE AND METHOD OF DRIVING THE SAME

This Nonprovisional Application claims priority under 35 U.S.C. §119(a) on Patent Application No. 10-2006-0038297 filed in Korea on Apr. 27, 2006, the entire contents of which are hereby incorporated by reference.

BACKGROUND OF THE INVENTION

1. Field of the Invention

The present invention relates to a liquid crystal display (LCD) device, more particularly, to an array substrate for an in-plane switching (IPS) mode LCD device being capable of displaying high quality images with an improved response rate.

2. Description of the Related Art

Generally, in the twist nematic (TN) mode LCD device, the pixel and common electrodes, by which a vertical electric field driving the liquid crystal (LC) layer is induced, are formed on different substrates.

On the other hand, in the IPS mode LCD device, the pixel and common electrodes are formed on the same substrate. A horizontal electric field is induced between the pixel and common electrodes, and the LC layer is driven by the horizontal electric field to have a wider viewing angle than the TN mode LCD device.

Figure 1:
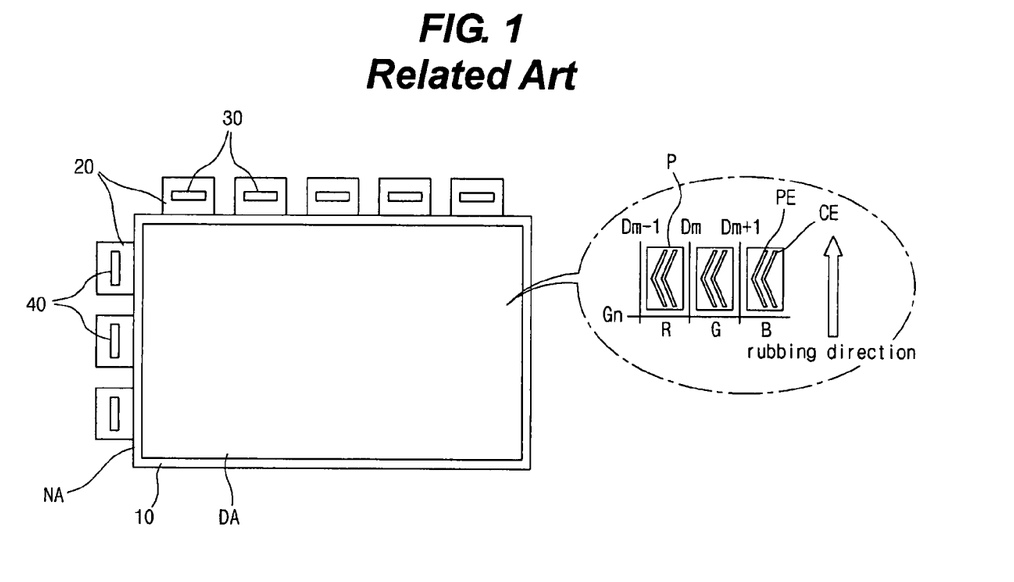
FIG. 1 is a schematic view showing an array substrate for an IPS mode LCD device according to the related art.

FIG. 1 is a schematic view showing an array substrate for an IPS mode LCD device according to the related art.

As shown in FIG. 1, display and non-display areas "DA" and "NA" are defined on a substrate 10. The non-display area "NA" surrounds the display area "DA". Images are displayed in the display area "DA". A plurality of data drivers 30 and a plurality of gate drivers 40 are formed on a plurality of tape carrier packages (TCPs) 20 in the non-display area "NA". The data drivers 30 generate image signals to display images. The gate drivers 40 generate gate signals to control the data signals. The TCPs 20 and the display area "DA" are connected by a plurality of electric lines (not shown). The data drivers 30 are disposed on one side of the substrate 10, and the gate drivers 40 are disposed on another side of the substrate 10.

A plurality of data lines "$D_{m-1}$", "$D_m$" and "$D_{m+1}$" and a plurality of gate lines "$G_n$" are formed in the display area "DA". The data lines "$D_{m-1}$", "$D_m$" and "$D_{m+1}$" and a plurality of gate lines "$G_n$" cross each other to define a plurality of pixel regions "P". The data lines "$D_{m-1}$", "$D_m$" and "$D_{m+1}$" are connected to the data drivers 30, and the gate lines "$G_n$" are connected to the gate drivers 40. Each pixel region P displays image having one of red "R", green "G" and blue "B" colors.

A common electrode "CE" and a pixel electrode "PE" are formed in each pixel region "P" on the substrate 10. A horizontal electric field is induced between the common and pixel electrodes "CE" and "PE". The common and pixel electrodes "CE" and "PE" may have an angle less than about 45 degrees with respect to the data lines "$D_{m-1}$", "$D_m$" and "$D_{m+1}$". The common and pixel electrodes "CE" and "PE" may be parallel to the data lines "$D_{m-1}$", "$D_m$" and "$D_{m+1}$" and alternately arranged with each other. The LCD layer is formed over the common and pixel electrodes "CE" and "PE". A rubbing process is performed to the LCD layer according to an arrow as shown in FIG. 1 to display black images when voltages are applied to the common and pixel electrodes "CE" and "PE". It may be referred to as a normally black mode.

Figure 2A:
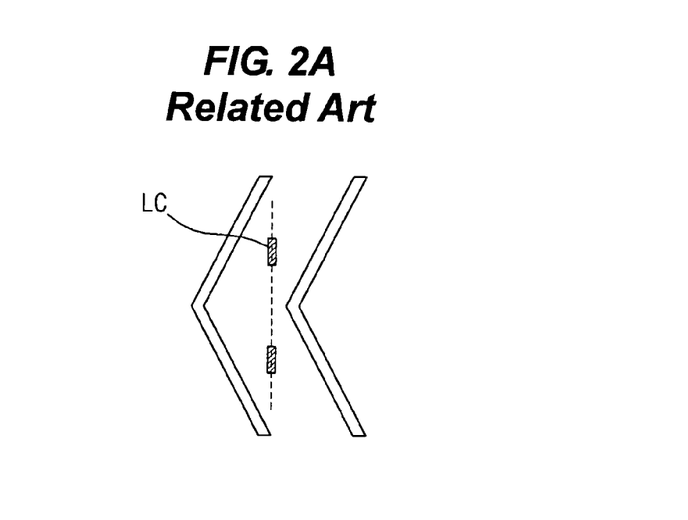
FIGS. 2A and 2B are schematic plane views for showing arrangements of LC molecules of an IPS mode LCD device according to the related art.
Figure 2B:
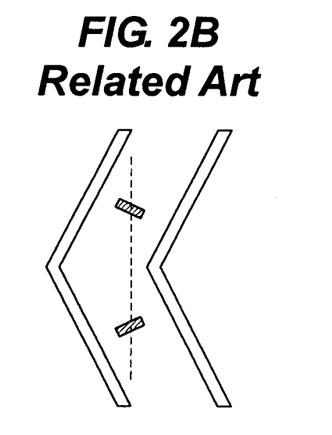

FIGS. 2A and 2B are a perspective view for explaining arrangements of LC molecules of an IPS mode LCD device according to the related art.

As shown in FIG. 2A, when voltages are not applied to the pixel and common electrodes "PE" and "CE", the LC molecules "LC" are aligned along an initial alignment direction.

As shown in FIG. 2B, when voltages, for example, 7 and 0 voltages are respectively applied to the pixel and common electrodes "PE" and "CE", are applied to the pixel and common electrodes "PE" and "CE" and the horizontal electric field are generated between the common and pixel electrodes "CE" and "PE", the LC molecules "LC" are aligned along a direction of the horizontal electric field. The LC molecules "LC" have different light transmittances depending on magnitude of the electric field. It may be called a rising step.

When the electric field between the common and pixel electrodes "CE" and "PE" are removed after the rising step, the LC molecules "LC" are realigned to the initial alignment direction. It may be called a falling step.

Movements of the LC molecules, such as the rising step and the falling step, appear in not only the IPS mode LCD device but also other display devices.

In the rising step, the LC molecules "LC" are responsive to the electric field such that they are quickly aligned along the direction of the electric field. However, in the falling step, the LC molecules "LC" are less responsive than the rising step. It is because the LC molecules "LC" are realigned to the initial alignment direction depending on the characteristics of the LC molecules and an alignment layer, for example, an elastic coefficient, a rotational viscosity, an aligning force, and so on.

Since the LC molecules "LC" are slowly realigned in the falling step, the LC molecules "LC" have undesired alignment in the next frame and the LCD device can not display desired images.

SUMMARY OF THE INVENTION

Accordingly, the present invention is directed to an array substrate for an IPS mode LCD device and a method of driving a display device having the same that substantially obviates one or more of the problems due to limitations and disadvantages of the related art.

An object of the present invention is to provide an array substrate for an IPS mode LCD device being capable of displaying high quality images and a method of driving an IPS mode LCD device having the array substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an in-plane switching mode liquid crystal display device comprises a pixel electrode in a pixel region; a common electrode in the pixel region, the common electrode being parallel to the pixel electrode; a first electrode in the pixel region and crossing the pixel and common electrodes; and a second electrode in the pixel region, the second electrode being parallel to the first electrode.

In another aspect of the present invention, an array substrate for an in-plane switching mode liquid crystal display device comprises first and second gate lines along a first direction on a substrate having a pixel region; a data line along a second direction different from the first direction on the substrate, the data line crossing one of the first and second gate lines to define the pixel region; a pixel electrode in the pixel region and along a third direction; a common electrode in the pixel region and along the third direction, the common electrode being spaced apart from the pixel electrode; a first electrode in the pixel region and along a fourth direction different from the third direction; and a second electrode in the pixel region and along the fourth direction, the second electrode being spaced apart from the first electrode.

In another aspect of the present invention, a method of driving an in-plane switching mode liquid crystal display device, which includes a pixel electrode on a first substrate, a common electrode on the first substrate, the common electrode parallel to the pixel electrode, a first electrode on the first substrate and crossing the pixel and common electrodes, a second electrode on the first substrate, the second electrode parallel to the first electrode, and a second substrate facing the first substrate, comprises: applying first and second voltages to the pixel and common electrodes, respectively, during a first period; and applying third and fourth voltages to the first and second electrodes, respectively, during a second period, the third voltage being different from the fourth voltage.

In another aspect of the present invention, an in-plane switching mode liquid display device comprises an array substrate. The array substrate comprises a pixel electrode in a pixel region; a common electrode in the pixel region, the common electrode parallel to the pixel electrode; a first electrode in the pixel region and crossing the pixel and common electrodes; and a second electrode in the pixel region, the second electrode being parallel to the first electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the preferred embodiments, examples of which are illustrated in the accompanying drawings.

Figure 3:
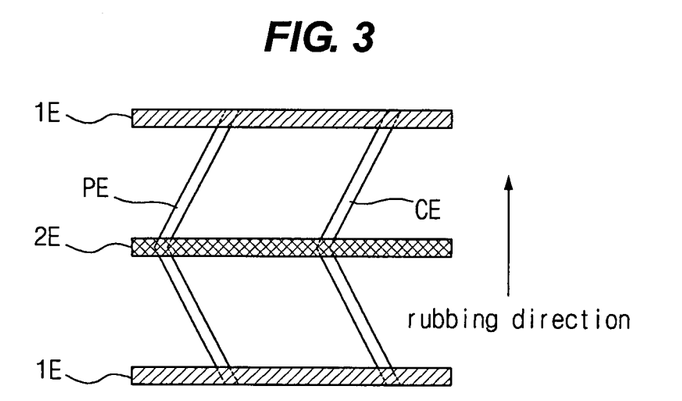
FIG. 3 is a schematic plane view showing a pixel region of an array substrate for an IPS mode LCD device according to a first exemplary embodiment of the present invention.

FIG. 3 is a schematic plane view showing a pixel region of an array substrate for an IPS mode LCD device according to a first exemplary embodiment of the present invention.

As shown in FIG. 3, not only common and pixel electrodes "CE" and "PE" but also first and second electrodes "1E" and "2E" are formed in pixel region. The common and pixel electrodes "CE" and "PE" are separated from and parallel to each other. Although the common and pixel electrodes "CE" and "PE" have an zigzag shape in FIG. 3, the common and pixel electrodes "CE" and "PE" may have another shapes, for example, a linear bar shape. The first and second electrodes "1E" and "2E" cross the common and pixel electrodes "CE" and "PE". The first and second electrodes "1E" and "2E" are parallel to and alternately arranged with each other. It should be noted that there can be a plurality of first and second electrodes alternately arranged with each other so that one second electrode "2E" is disposed between two first electrodes "1E". The first and second electrodes "1E" and "2E" and the pixel and common electrodes "PE" and "CE" are formed of one of a transparent conductive material, such as indium-tin-oxide (ITO) and indium-zinc-oxide (IZO), and a metallic material. The first and second electrodes "1E" and "2E" are formed on the same substrate as the common and pixel electrodes "CE" and "PE". The first and second electrodes "1E" and "2E" may be formed of a different layer from the common and pixel electrodes "CE" and "PE" to be electrically disconnected to the common and pixel electrodes "CE" and "PE".

A first electric field is induced between the pixel and common electrodes "PE" and "CE". In the rising step, the LC molecules are arranged along the first electric field. A second electric field is induced between the first and second electrodes "1E" and "2E" to be parallel to an initial alignment direction of the LC molecules. In the falling step, the LCD molecules are fast rearranged to the initial arrangement of the LC molecules due to the second electric field between the first and second electrodes "1E" and "2E". Although the common and pixel electrodes are formed of the same layer in FIG. 3, the common and pixel electrodes may be formed of different layers. The former may be referred to as the IPS mode, and the later may be referred to as a fringe field switching (FFS) mode.

Although not shown in FIG. 3, a gate line and a data line cross to define a pixel region. The common and pixel electrodes "CE" and "PE" and the first and second electrodes "1E" and "2E" are formed in each pixel region. A thin film transistor (TFT) is formed in each pixel region and electrically connected to the gate and data lines. The TFT is turned on by a gate signal through the gate line, and the pixel voltage is applied to the pixel electrode "PE" through the data line. The pixel and common electrodes "PE" and "CE" may be inclined to the gate line with an angle less than about 45 degrees.

Voltages are applied to the first and second electrodes "1E" and "2E" using one of a timing controller (not shown) and an additional circuit unit. The voltages are applied to the first and second electrodes "1E" and "2E" per a desired period and for a desired time.

Figure 4:
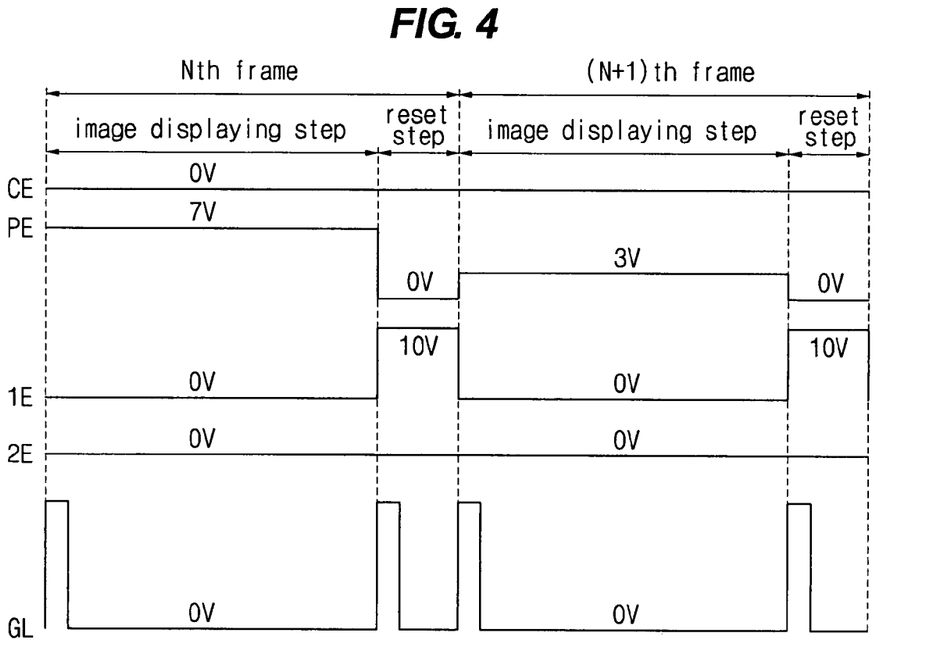
FIG. 4 is a timing chart for illustrating a driving method of an IPS mode LCD device according to a first exemplary embodiment of the present invention.
Figure 5A:
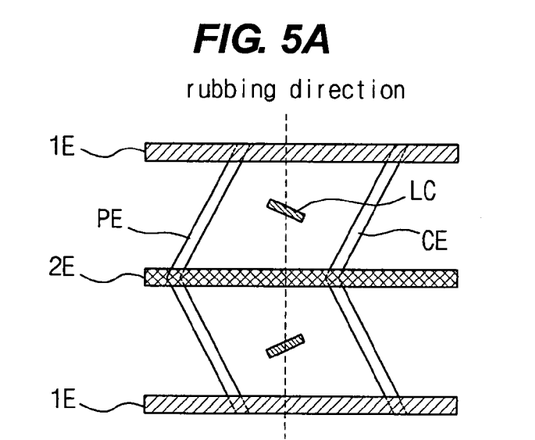
FIGS. 5A to 5C are schematic plane views for showing arrangements of LC molecules of an IPS mode LCD device according to a first exemplary embodiment of the present invention.
Figure 5B:
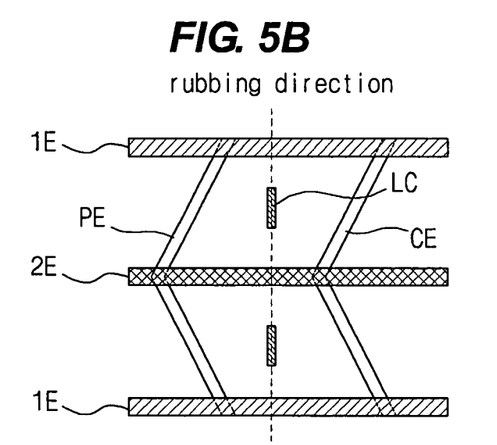
Figure 5C:
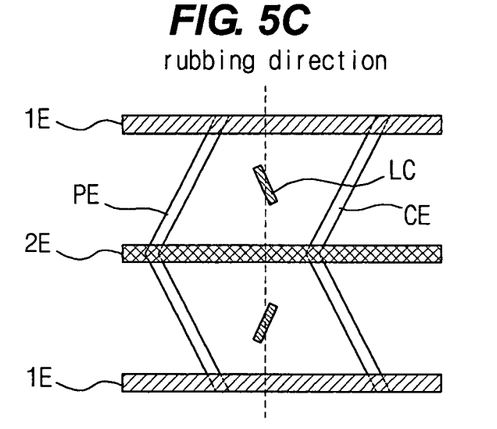

FIG. 4 is a timing chart for illustrating a driving method of an IPS mode LCD device according to a first exemplary embodiment of the present invention, and FIGS. 5A to 5C are schematic plane views for showing arrangements of LC molecules of an IPS mode LCD device according to a first exemplary embodiment of the present invention. In particular, FIGS. 5A to 5C show arrangements of LC molecules in an image displaying step and a reset step in the Nth frame, and an image displaying step in the (N+1)th frame, respectively. One frame includes the image displaying step and the reset step.

In the image displaying step in the Nth frame, when the gate signal is applied to the TFT through the gate line, a first pixel voltage is applied to the pixel electrode "PE". At the same time, the common voltage is applied to the common electrode "CE". The common electrode "CE" maintains the common voltage. For example, to produce a white color image, the first pixel voltage of 7V is applied to the pixel electrode "PE", and the common voltage of 0V is applied to the common electrode "CE". In this case, the LC molecules "LC" are arranged along a direction of a first electric field between the pixel and common electrodes "PE" and "CE" as shown in FIG. 5A to produce the white color image. It is called the rising step. In the image displaying step, an electric field is not induced between the first and second electrodes "1E" and "2E".

Next, the reset step is performed after the image displaying step. In the reset step, a second electric field is induced between the first and second electrodes "1E" and "2E" to fast rearrange the LC molecules to the initial arrangement. Namely, to remove the first electric field between the common and pixel electrodes "CE" and "PE", a second pixel voltage, which may be the same as the common voltage, is applied to the pixel electrode "PE". Moreover, first and second voltages are respectively applied to the first and second electrodes "1E" and "2E" to induce the second electric field between the first and second electrodes "1E" and "2E". The first voltage has a range between 5V and 50V. In FIG. 4, the first and second voltages are 10V and 0V, respectively. The second electrode "2E" may maintain the second voltage. The first and second voltages may be applied to the first and second electrodes "1E" and "2E" using a timing controller. However, the first and second voltages may be applied to the first and second electrodes "1E" and "2E" using additional TFT and circuits.

As a result, the second electric field is generated between the first and second electrodes "1E" and "2E", and the LC molecules "LC" are fast rearranged into the initial arrangement as shown in FIG. 5B. It is called the falling step. In this case, the reset step may be between 1/20 and 1/2 as much as the period of the one frame. The period of the reset step may be various depending on characteristics of the LC molecules and the alignment layer.

Next, in the applying step of the (N+1)th frame, a third pixel voltage, which may be 3V, is applied to the pixel electrode "PE". Since the common electrode "CE" maintains the common voltage of 0V, a third electric field is generated between the pixel and common electrodes "PE" and "CE". The LC molecules "LC" are arranged along the third electric field, as shown in FIG. 5C. In this case, the first and second electrodes "1E" and "2E" do not generate an electric field. Since the LC molecules "LC" return to the initial arrangement due to the reset step, the LC molecules "LC" are very responsive to the third electric field to produce desired images. After the image displaying step of the (N+1)th frame, the reset step is also performed.

Figure 6:
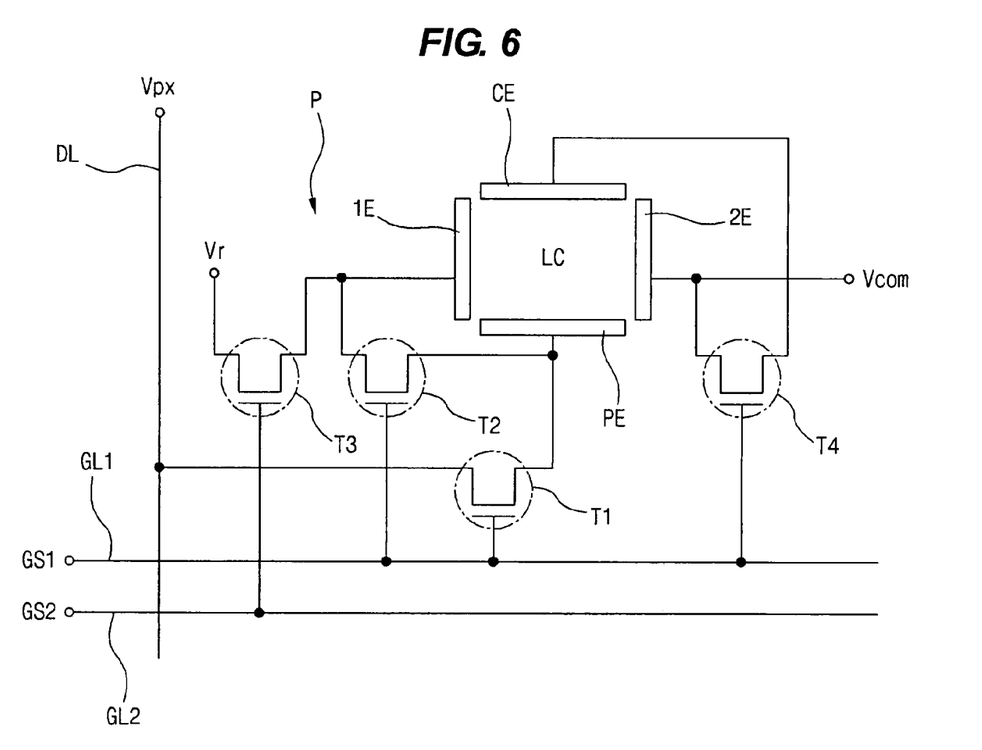
FIG. 6 is a schematic view showing a pixel region of an array substrate for an IPS LCD device according to a second exemplary embodiment of the present invention.

FIG. 6 is a schematic view showing a pixel region of an array substrate for an IPS LCD device according to a second exemplary embodiment of the present invention.

As shown in FIG. 6, a data line "DL" crosses first and second gate lines "GL1" and "GL2". The pixel region "P" is defined by crossing between the data line "DL" and one of the first and second gate lines "GL1" and "GL2". The common and pixel electrodes "CE" and "PE" and the first and second electrodes "1E" and "2E" are formed in the pixel region "P". The common and pixel electrodes "CE" and "PE" and the first and second electrodes "1E" and "2E" are arranged to form a square shape. The common electrode "CE" faces the pixel electrode "PE", and the first electrode "1E" faces the second electrode "2E".

First to fourth switching elements "T1", "T2", "T3" and "T4" are formed in the pixel region "P". The first to fourth switching elements "T1", "T2", "T3" and "T4" may be the TFTs. For example, the first switching element "T1" of the TFT includes a gate line, a semiconductor layer, a source electrode and a drain electrode. The gate line extends from the gate line, and the source electrode extends from the data line. The drain electrode is separated from the source electrode.

The first switching element "T1" is connected to the data line "DL" and the first gate line "GL1". The first switching element "T1" is turned on depending on the first gate signal, which is applied to the first switching element "T1" through the first gate line "GL1", and then the pixel voltage "Vpx" is applied to the pixel electrode "PE" through the data line "DL" and the first TFT "T1".

The second switching element "T2" is connected to the first switching element "T1" and the first electrode "1E". The second switching element "T2" is turned on depending on the first gate signal, and then the pixel voltage "Vpx" is applied to the first electrode "1E".

The third switching element "T3" is connected to the second gate line "GL2" and the first electrode "1E". The third switching element "T3" is turned on depending on the second gate signal, which is applied to the third switching element "T3" through the second gate line "GL2", and then a reset voltage "Vr" is applied to the first electrode "1E".

The fourth switching element "T4" is connected to the first gate line "GL2" and the common electrode "CE". The fourth switching element "T4" is turned on depending on the first gate signal, and then the common voltage "Vcom", which is directly applied to the second electrode "2E", is applied to the common electrode "2E". The common voltage "Vcom" may be directly applied to the common electrode "CE" without the fourth switching element "T4".

Figure 7:
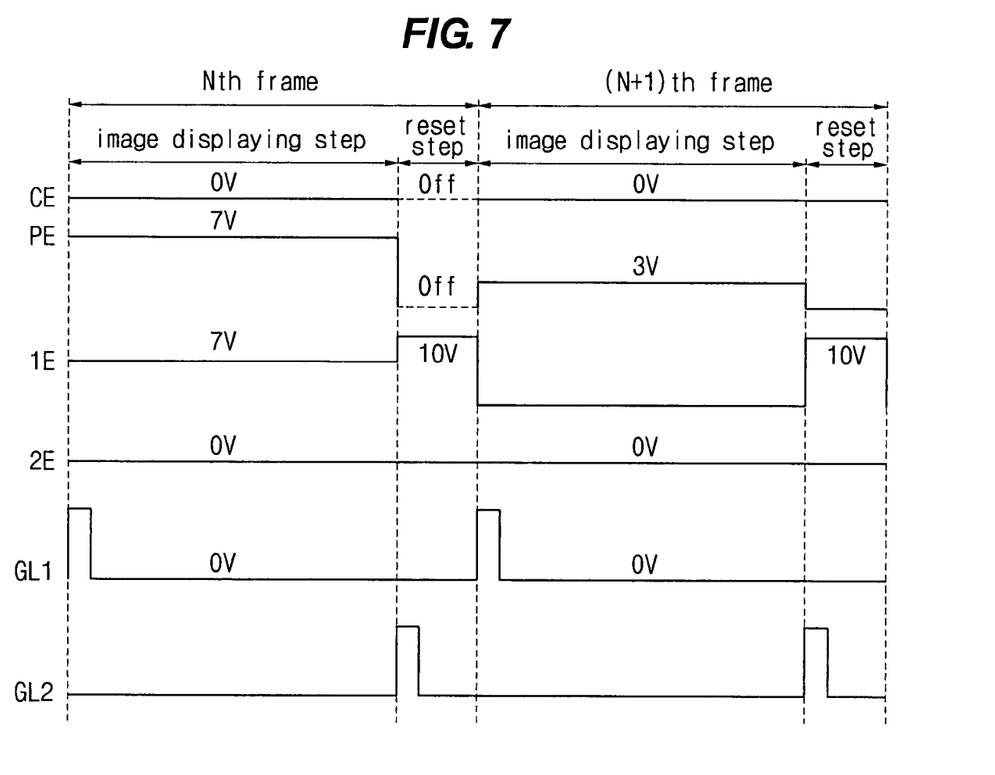
FIG. 7 is a timing chart for illustrating a driving method of an IPS mode LCD device according to a second exemplary embodiment of the present invention.
Figure 8A:
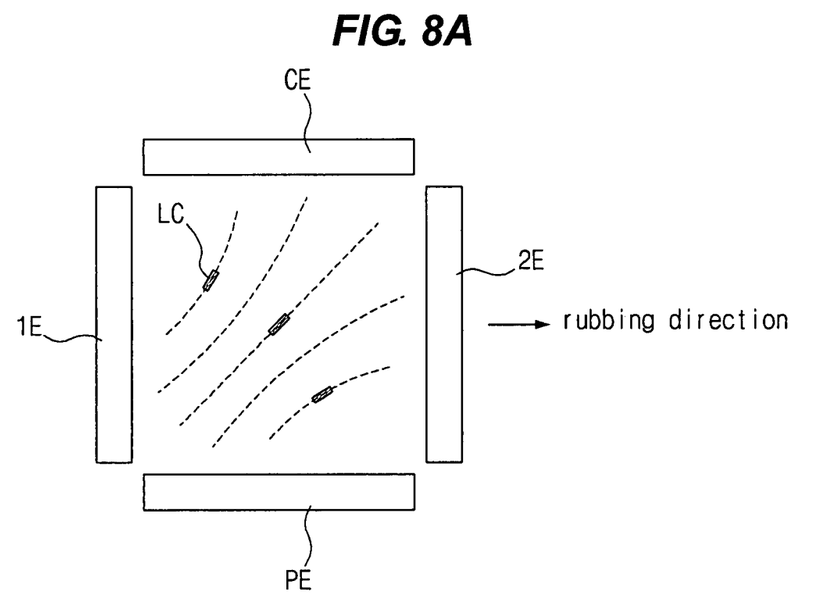
FIGS. 8A and 8B are schematic plane views for showing arrangements of LC molecules of an IPS mode LCD device according to a second exemplary embodiment of the present invention.
Figure 8B:
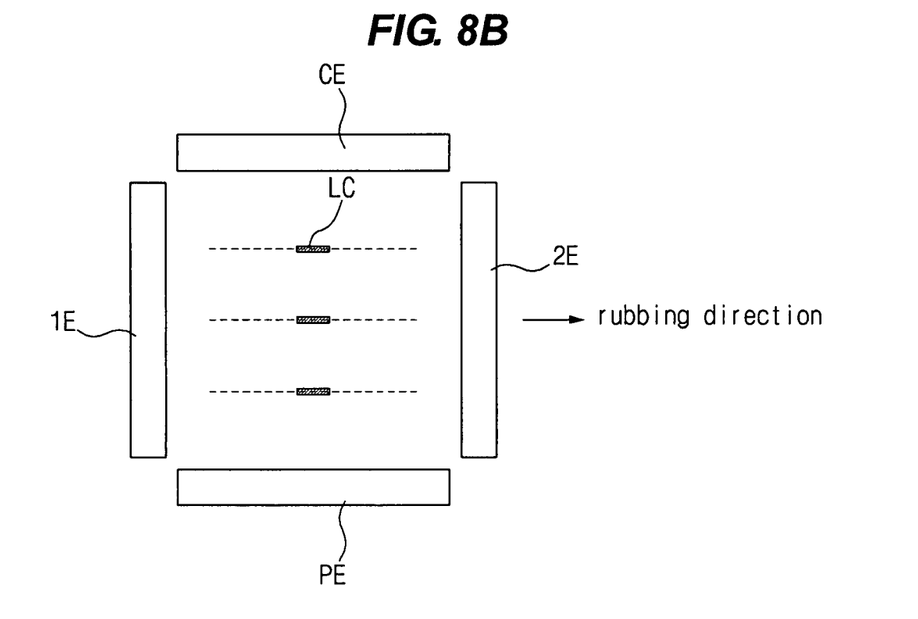

A method of driving an IPS mode LCD device having the above-mentioned array substrate is explained with reference to FIGS. 7, 8A and 8B. FIG. 7 is a timing chart for illustrating a driving method of an IPS mode LCD device according to a second exemplary embodiment of the present invention, and FIGS. 8A and 8B are schematic plane views for showing arrangements of LC molecules of an IPS mode LCD device according to a second exemplary embodiment of the present invention.

The IPS mode LCD device displays a first image in the Nth frame and a second image in the (N+1)th image. Each of the Nth and (N+1)th frames includes the image displaying step and the reset step. The reset step is disposed between the image displaying steps in the Nth and (N+1)th frames. FIGS. 8A and 8B show arrangements of LC molecules in the image displaying step and the reset step, respectively.

In the image displaying step, voltages are applied to the electrodes. To display a white image, the first switching element "T1" (of FIG. 6) is turned on by the first gate signal, and then the first pixel voltage is applied to the pixel electrode "PE". At the same time, the second switching element "T2" (of FIG. 6) is also turned on by the first gate signal, and then the first pixel voltage is applied to the first electrode "1E". Moreover, the fourth switching element "T4" (of FIG. 6) is also turned on by the first gate signal, and then the common voltage "Vcom" is applied to the common electrode "CE". The common voltage "Vcom" is applied to the second electrode "2E" irrespective of being on and off of the fourth switching element "T4" (of FIG. 6). The first pixel voltage and the common voltage "Vcom" may be 7V and 0V, respectively.

Namely, the pixel electrode "PE" and the first electrode "1E" have the same voltage, and the common electrode "CE" and the second electrode "2E" have the same voltage. As a result, the pixel electrode "PE" and the first electrode "1E" function as one electrode, and the common electrode "CE" and the second electrode "2E" function as the other electrode. A first electric field is generated between the one and the other electrodes such that the LC molecules "LC" are arranged along the first electric field as shown in FIG. 8A.

Next, in the reset step, a second electric field is generated between the first and second electrodes "1E" and "2E", but not between the pixel and common electrodes "PE" and "CE", to fast rearrange the LC molecules "LC" to the initial arrangement.

In more details, to remove the first electric field between the pixel and common electrodes "PE" and "CE", an "off" state is induced between the pixel and common electrodes "PE" and "CE". Namely, the second pixel voltage, which is the same as the common voltage, is applied to the pixel and common electrodes "PE" and "CE", and the electric field is not generated between the pixel and common electrodes "PE" and "CE". In other hands, the third switching element "T3" is turned on by the second gate signal, and then a reset voltage "Vr" (of FIG. 6) is applied to the first electrode "1E". The reset voltage "Vr" (of FIG. 6) may be between 5V and 50V. Since the second electrode "2E" maintains the common voltage "Vcom" different from the reset voltage, a second electric field is generated between the first and second electrodes "1E" and "2E". Then, the LC molecules "LC" are arranged along the second electric field. The second electric filed may be parallel to the initial arrangement of the LC molecules "LC", as shown in FIG. 8B. In this case, the reset step may be between 1/20 and 1/2 as much as the period of the one frame. The period of the reset step may be various depending on characteristics of the LC molecules and the alignment layer.

After the reset step, the image displaying step of the (N+1)th frame is performed. In the image displaying step of the (N+1)th frame, a third pixel voltage is applied to the pixel electrode "PE" and the first electrode "1E". Similarly to the image displaying step of the Nth frame, the pixel electrode "PE" and the first electrode "1E" have the same voltage, and the common electrode "CE" and the second electrode "2E" have the same voltage. A third electric field is generated between the combination of the pixel and first electrodes "PE" and "1E" and the combination of the common and second electrodes "CE" and "2E", and the LC molecules "LC" are arranged along the third electric field. Since the LC molecules "LC" are arranged in the initial arrangement of the LC molecules "LC" due to the reset step, the IPS mode LCD device can display desired images.

After the image displaying step of the (N+1)th frame, the reset step is also performed.

It will be apparent to those skilled in the art that various modifications and variations can be made in the organic electroluminescent device and fabricating method thereof of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, the array substrate comprising:
   a pixel electrode in a pixel region;
   a common electrode in the pixel region, the common electrode being parallel to the pixel electrode;
   a first electrode in the pixel region and crossing the pixel and common electrodes; and
   a second electrode in the pixel region, the second electrode being parallel to the first electrode,
   wherein the pixel electrode is electrically insulated from the first electrode and the second electrode, and the common electrode is electrically insulated from the first electrode and the second electrode, and wherein the pixel electrode and the common electrode form a first electric field, and the first and second electrodes form a second electric field having a different direction from the first electric field.

2. The array substrate according to claim 1, further comprising
   a substrate;
   a gate line on the substrate; and
   a data line crossing the gate line to define the pixel region.

3. The array substrate according to claim 2, wherein the first and second electrodes are parallel to the gate line.

4. The array substrate according to claim 1, wherein the first and second electrodes includes one of a transparent conductive material and a metallic material, and wherein the transparent conductive material includes one of indium-tin-oxide and indium-zinc-oxide.

5. The array substrate according to claim 1, further comprising at least one third electrode and at least one fourth electrode alternately arranged with each other and parallel to the first and second electrode.

6. The array substrate according to claim 1, wherein the pixel and common electrodes have a zigzag shape.

7. The array substrate according to claim 1, wherein the pixel and common electrodes have an angle of about 45 degrees with respect to the first and second electrodes.

8. The array substrate according to claim 1, wherein the pixel electrode, the common electrode, the first electrode and the second electrode form a square shape.

9. The array substrate according to claim 1, wherein the common electrode and the second electrode receive the same voltage.

10. The array substrate according to claim 1, wherein the pixel electrode and the first electrode receive different voltages.

11. The array substrate according to claim 1, wherein the pixel and common electrodes are respectively formed on first and second layers, and the first and second electrodes are respectively formed on third and fourth layers, wherein each of the third and fourth layers is different from both the first and second layers.

12. The array substrate according to claim 11, wherein the first and second layers are the same, and the third and fourth layers are the same.

13. The array substrate according to claim 1, wherein the pixel electrode and the common electrode form a first electric field in an image displaying period such that liquid crystal molecules in the pixel region rotate from an initial arrangement to a display arrangement by the first electric field, the first electrode and the second electrode form a second electric field in a reset period such that the liquid crystal molecules in the pixel region return to the initial arrangement by the second electric field, and the image displaying period and the reset period are non-overlapped.

14. An array substrate for an in-plane switching mode liquid crystal display device, the array substrate comprising:
   first and second gate lines extending along a first direction on a substrate having a pixel region;
   a data line extending along a second direction different from the first direction on the substrate, the data line crossing one of the first and second gate lines to define the pixel region;
   a pixel electrode in the pixel region and along a third direction;
   a common electrode in the pixel region and extending along the third direction, the common electrode being spaced apart from the pixel electrode;
   a first electrode in the pixel region and extending along a fourth direction different from the third direction;
   a second electrode in the pixel region and extending along the fourth direction, the second electrode being spaced apart from the first electrode;
   a first switching element connected to the first gate line and the pixel electrode;
   a second switching element connected to the first switching element and the first electrode;
   a third switching element connected to the second gate line and the first electrode; and
   a common line connected to the common electrode and the second electrode.

15. The array substrate according to claim 14, wherein the pixel electrode and the common electrode form a first electric field in an image displaying period such that liquid crystal molecules in the pixel region rotate from an initial arrangement to a display arrangement by the first electric field, the first electrode and the second electrode form a second electric field in a reset period such that the liquid crystal molecules in the pixel region return to the initial arrangement by the second electric field, and the image displaying period and the reset period are non-overlapped.

16. The array substrate according to claim 14, further comprising a fourth switching element connected to the first gate line, the common electrode and the common line.

17. The array substrate according to claim 16, wherein the first, second, third and fourth switching elements are thin film transistor.

18. The array substrate according to claim 14, wherein each of the first and second electrodes includes one of a transparent conductive material and a metallic material, and wherein the transparent conductive material includes one of indium-tin-oxide and indium-zinc-oxide.

19. The array substrate according to claim 14, wherein the third direction is the same as the first direction.

20. The array substrate according to claim 14, wherein the fourth direction is the same as the second direction.

21. The array substrate according to claim 14, wherein the pixel and common electrodes and the first and second electrodes form a square shape.

22. The array substrate according to claim 14, wherein the pixel and common electrodes are respectively formed on first and second layers, and the first and second electrodes are respectively formed on third and fourth layers, wherein each of the third and fourth layers is different from both the first and second layers.

23. The array substrate according to claim 22, wherein the first and second layers are the same, and the third and fourth layers are the same.

24. An in-plane switching mode liquid display device, comprising:
   an array substrate, the array substrate comprising:
   a pixel electrode in a pixel region;
   a common electrode in the pixel region, the common electrode parallel to the pixel electrode;
   a first electrode in the pixel region and crossing the pixel and common electrodes; and
   a second electrode in the pixel region, the second electrode being parallel to the first electrode,
   wherein the pixel electrode is electrically insulated from the first electrode and the second electrode, and the common electrode is electrically insulated from the first electrode and the second electrode, and wherein the pixel electrode and the common electrode form a first electric field, and the first and second electrodes form a second electric field having a different direction from the first electric field.

25. The device according to claim 24, wherein the pixel electrode and the common electrode form a first electric field in an image displaying period such that liquid crystal molecules in the pixel region rotate from an initial arrangement to a display arrangement by the first electric field, the first electrode and the second electrode form a second electric field in a reset period such that the liquid crystal molecules in the pixel region return to the initial arrangement by the second electric field, and the image displaying period and the reset period are non-overlapped.

26. The device according to claim 24, wherein the first and second electrodes are parallel to a gate line.

27. The device according to claim 24, wherein the pixel electrode, the common electrode, the first electrode and the second electrode form a square shape.

* * * * *

UNITED STATES PATENT AND TRADEMARK OFFICE
CERTIFICATE OF CORRECTION

PATENT NO.       : 8,681,302 B2
APPLICATION NO.  : 11/790618
DATED            : March 25, 2014
INVENTOR(S)      : Sang-Ho Choi et al.

Page 1 of 1

It is certified that error appears in the above-identified patent and that said Letters Patent is hereby corrected as shown below:

ON THE TITLE PAGE:

Item (75), Inventors, change "Jong-Jin Park, Annyang-Si (KR)" to --Jong-Jin Park, Anyang-Si (KR)--.

Signed and Sealed this
Fifteenth Day of July, 2014

Michelle K. Lee
*Deputy Director of the United States Patent and Trademark Office*